United States Patent [19]
Gasser

[11] 3,867,590
[45] Feb. 18, 1975

[54] CABLE CARRIER

[75] Inventor: William James Gasser, Long Grove, Ill.

[73] Assignee: Brite-O-Matic Manufacturing, Inc., Arlington Heights, Ill.

[22] Filed: Oct. 29, 1973

[21] Appl. No.: 410,601

[52] U.S. Cl. .......................... 191/12 R, 137/355.16
[51] Int. Cl. ............................................ H02g 11/00
[58] Field of Search ........................ 137/355.16; 104/89–95; 191/12 R

[56] References Cited
UNITED STATES PATENTS

| | | | |
|---|---|---|---|
| 2,858,381 | 10/1958 | Goldberg | 191/12 R |
| 3,548,122 | 12/1970 | Hay | 191/12 R |

*Primary Examiner*—Lloyd L. King
*Assistant Examiner*—D. W. Keen
*Attorney, Agent, or Firm*—Hume, Clement, Brinks, Willian, Olds & Cook, Ltd.

[57] ABSTRACT

A cable carrier assembly for handling the power cable between a fixed power source terminal and a motor on a movable carriage. A track runs the width of a vehicle washing device. Slides mounted in the track are clamped to a coiled, resiliently extensible cable. The clamps rotate through 90° and tilt in their travel without binding in the track as the cable extends and retracts without sagging down into adjacent equipment.

4 Claims, 5 Drawing Figures

PATENTED FEB 18 1975  3,867,590

CABLE CARRIER

FIELD OF THE INVENTION

This invention relates in general to vehicle washing devices. It relates particularly to safety equipment on an automatic vehicle washing devices.

BACKGROUND OF THE INVENTION

There are numerous and widely varying automatic, semi-automatic and manual vehicle washing devices presently in use. Exemplary of one type of device is that illustrated in the Bevier U.S. Pat. No. 3,706,109. This type of vehicle washing device employs a movable carriage in the form of an arch which rolls on tracks bracketing an automobile, for example. An operator drives the carriage back and forth between opposite end stops on the tracks while brushes and spraying equipment clean the auto.

One of the brushes is mounted on a vertical shaft which is rotatably journalled in a carrier transversely movable on the device carriage itself. An electric motor on the carrier turns the vertical shaft to rotate the brush. The motor is normally connected to a power-source terminal on the carriage by a flexible power cable fixed at one end at the terminal and movable at the other end with the carrier.

SUMMARY OF THE INVENTION

A primary object of this invention is to provide a new and improved cable carrier assembly for handling the power cable between a fixed power source terminal and a motor on the movable carriage. Another object is to provide a cable carrier assembly which is effective to prevent the cable from getting tangled and/or damaged while the brush carrying carriage travels transversely of the main carriage. Still another object is to provide a cable carrier assembly which permits a saving on the amount of cable which is required. It is a further object to provide an inexpensive and simple cable carrier assembly for handling the power cable.

The foregoing and other objects are realized in accord with the invention by providing a transversely extending track which is mounted on the horizontal, top frame member of the carriage arch. The track has a downwardly opening, horizontally elongated slot formed in it in which four slide units are loosely mounted. The slide units, in effect, are also slotted so that they seat in sliding relationship in the track slot.

Each of the slide units includes a depending ear to which a cable clamp is affixed. Each clamp grips the cable at a prescribed point along its length. The slide units are spaced along the length of the cable. The cable is connected at one end to the power source connector on the carriage and at the other end to an electric motor mounted on the vertical brush carrier.

BRIEF DESCRIPTION OF THE DRAWINGS

The invention, including its construction and method of operation, along with additional objects and advantages thereof, is illustrated more or less diagrammatically in the drawing, in which.

DESCRIPTION OF THE PREFERRED EMBODIMENT

Figure 1:
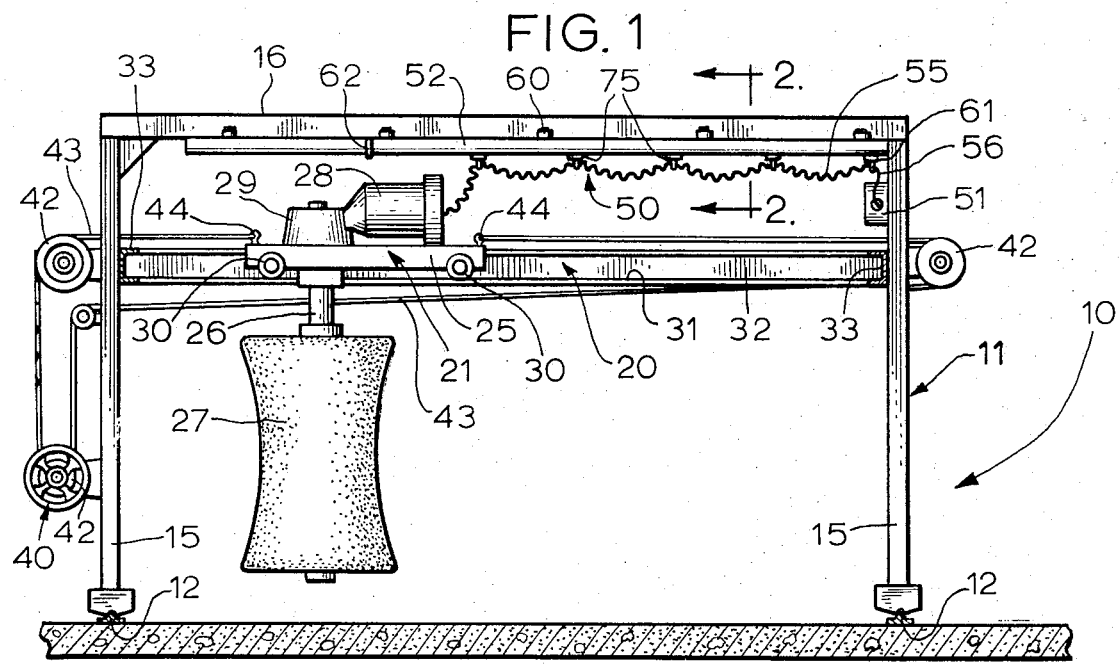
FIG. 1 is a front elevational view of a portion of the carriage of a vehicle washing device incorporating a cable carrier assembly embodying features of the invention, with parts away.
Figure 2:
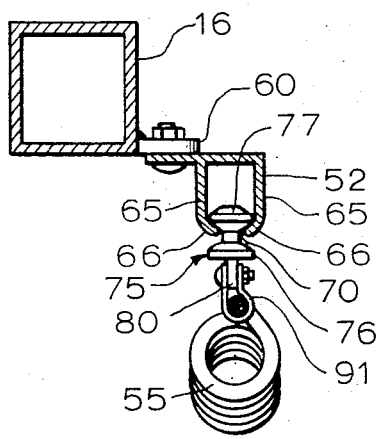
FIG. 2 is a sectional view taken along line 2—2 of FIG. 1.

Turning now to the drawing, and particularly to FIG. 1, a portion of a vehicle washing device embodying features of the invention is illustrated generally at 10. The device 10 includes an inverted U-shaped carriage 11 which travels on parallel tracks 12 in the manner described in applicant's co-pending application, Ser. No. 402,059, filed Oct. 1, 1973, entitled "WHEEL GUARD AND TRAVEL STOP." The carriage 11 travels in a direction perpendicular to the drawing sheet, as illustrated in FIG. 1, defining an arch over a vehicle as it moves longitudinally of the vehicle and washes it generally in the manner shown in the aforementioned Bevier patent.

The carriage 11 includes vertical side frames 15 which support a horizontally disposed roof frame 16. The frames 15 and 16 are lightweight structural steel components fabricated in a well-known manner and connected by conventional welding techniques. A track assembly 20 is mounted between the side frames 15 beneath the roof frame 16.

Mounted on the track assembly 20 for movement transversely of the carriage 11 between the side frames 15 is a vertical brush carrier assembly 21.

The carrier assembly 21 includes a carrier body 25 in which is journalled the vertical shaft 26 of the brush 27. An electric motor 28 mounted on the body 25 drives the shaft 26 through a right angle gear drive 29 directly connected to shaft 26 to rotate the vertical brush 27.

The carrier body 25 is mounted on wheels 30 which travel on the lower flanges 31 of channel members 32 forming the longitudinal stringers of the track assembly 20. The longitudinal stringers 32 are welded, at opposite ends, to channel members 33. The channel members 33 are, in turn, welded to the corresponding vertical side frames 15.

The carrier assembly 21 is moved transversely of the carriage 11 by a hand-operated wheel 40 mounted on one of the side frames 15 and connected to the carrier body 25 through an arrangement of pulleys 42 and a cable 43. The cable 43 is connected at its opposite free ends 44 to the carrier body 25.

Operation of the wheel 40 in opposite directions is effected to move the carrier assembly 21 transversely of the carriage 11 between stop positions at the opposite side frames 15. The motor 28 rotates the vertical brush 27 to wash the front of a vehicle as it moves across the carriage 11. When the carrier assembly is in position against either one of the side frames 15 and the carriage 11 is moved along the tracks 12, in a well-known manner, the brush 27 washes a selected side of a properly positioned vehicle.

The electric motor 28 is, according to the present invention, connected by a three wire electric cord 50 to a power source terminal 51 mounted on the side frame 15 opposite the side frame 15 upon which the hand wheel 40 is mounted. The cord 50 includes a resiliently extendable, coiled cable segment 55 supported by a coil cord support track 52. An uncoiled cord segment 56 extends downwardly from the track 52 to the power source terminal 51.

Referring now to FIGS. 2–5, it will be seen that the track 52 is suspended from the roof frame 16 by tabs 60 suitably fastened to both the frame and the track. A plurality of such tabs 60 are positioned along the length of the track 52, which extends from an end 61, starting inside of the side frame 15 upon which the power source terminal 51 is mounted, to an inner end 62 disposed approximately seven-eighths of the distance from the aforementioned side frame 15 to the opposite side frame 15 upon which the pulleys 42 are mounted.

The track 52 is in the form of an inverted channel member having downwardly extending legs 65 terminating in longitudinally extending free ends 66 which curve inwardly of the major portion of the legs 65 to define a slot 70 which extends the longitudinal length of the track.

Figure 5:
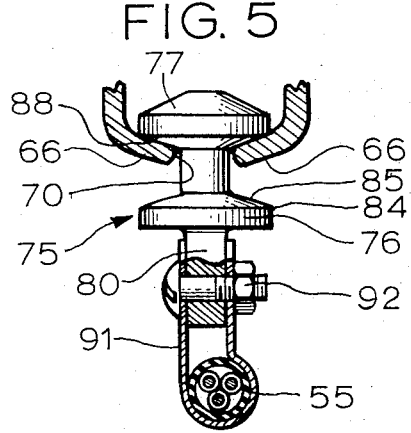
FIG. 5 is an enlarged view of a portion of the carrier cable assembly illustrated in FIG. 2.

Mounted for sliding movement on the track 52, and seated between the opposite free ends 66 of the channel member's side legs 65 defining the slot 70, are five slide units 75. Each of the slide units 75, one of which is shown in detail in FIG. 5, is identical in construction and is formed in one piece of non-conductive material. The base 76 has a downwardly extending ear 80 formed thereon as an integral part of the slide unit 75. As part of the slide unit 75, a disc 84 having a segmentally spherical upper surface 85 is formed.

The narrow center section extends upwardly through the slot 70 in the track 52. The cap 77, which has a segmentally spherical lower surface 88, is a part of the slide unit 75.

Depending from the ear 80 is a cable clamp 91, fastened by a conventional nut and bolt assembly 92. The cable clamp 91 of each slide unit 75 is adapted to be clamped to the coiled cable segment 55 at evenly spaced intervals along its length.

Figure 3:
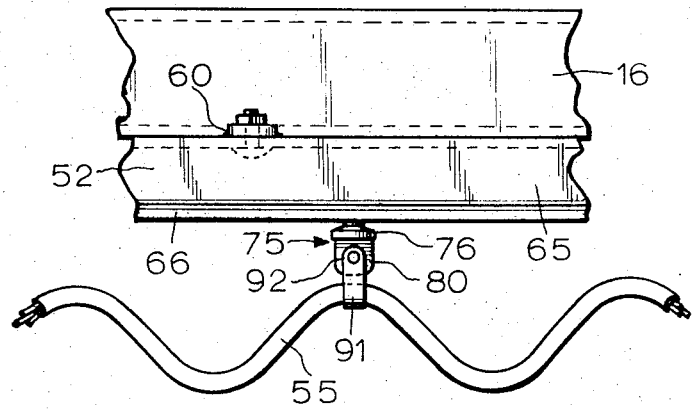
FIG. 3 is a side elevational view of the portion of the cable carrier assembly illustrated in FIG. 2.

With the carrier assembly 21 moved toward its leftmost position, as seen in FIG. 1, the coiled cable segment 55 is substantially extended. FIG. 3 illustrates the cable in detail. The five slide units 75 carry the cable segment 50 in substantially horizontal relationship as it resiliently extends. The segmentally spherical surfaces 88 and 85 on the slide unit 75 prevent the slide unit from binding as it moves along in the slot 70 of the track 52. At the same time, the base member 76 rotates 90° relative to the head member 77 so that the clamp 91 is positioned as illustrated in FIG. 5.

Figure 4:
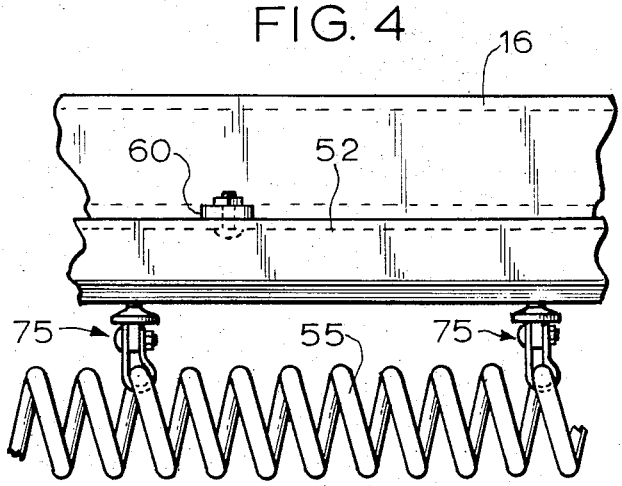
FIG. 4 is a view similar to FIG. 3, showing the cable carrier assembly in retracted position.

When the carrier assembly 21 moves toward the right in FIG. 1, the resilient cable segment 55 retracts into the relationship illustrated in FIG. 4. It does not sag, but is still retained in substantially horizontal relationship by the slide unit 75. Once again, the slide units do not bind in the slot 70. As the coiled cable segment 55 contracts, the base members 76 of the slide units 75 rotate 90° into the position illustrated in FIG. 4.

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A cable carrier assembly for handling a power cable between a fixed power source terminal on a support frame and a carriage mounted for travel on the frame, comprising:
    a. elongated track means on said frame,
    b. said track means comprising an inverted channel member including depending leg flanges which are formed inwardly at their lower, free ends, to define a slot narrower than said channel member,
    c. a section of said power cable being coiled and resiliently extensible from a compact, retracted length to an extended length,
    d. a plurality of slide units mounted on said track means for longitudinal movement relative thereto,
    e. each of said slide units extending through said slot and suspended from said inwardly formed, lower free ends of said leg flanges,
    f. each of said slide units comprising a base and a cap,
    g. said caps being retained within said channel member by said free ends of said leg flanges and said bases being suspended below said free end,
    h. said bases and said caps having opposed, generally segmentally spherical surfaces formed thereon whereby said slide units can tilt in said slot and still slide relative thereto without binding, and
    i. each of said slide units including means fastening it to said cable section whereby retraction and extension of said cable section as said carriage travels relative to said frame is accommodated while said cable section is held immediately adjacent said track means between said slide units.

2. The cable carrier assembly of claim 1 further characterized in that:
    a. each of said bases has a cable clamp depending therefrom fastened to said cable section,
    b. said bases being rotatable about the vertical axes of corresponding slide units to permit said clamps to rotate through approximately 90° as said cable section extends and retracts.

3. The cable carrier assembly of claim 1 further characterized in that:
    a. said support frame comprises vertical side frames joined by a horizontal top frame,
    b. said elongated track means being suspended from said top frame between said side frames.

4. The cable carrier assembly of claim 3 further characterized in that:
    a. said track means extends approximately seven-eighths of the distance between said side frames.

* * * * *